United States Patent
Panitz et al.

(10) Patent No.: US 7,226,704 B2
(45) Date of Patent: Jun. 5, 2007

(54) ELECTROLYTES FOR LITHIUM ION BATTERIES

(75) Inventors: Jan-Christoph Panitz, Frankfurt am Main (DE); Ulrich Wietelmann, Friedrichsdorf (DE); Markus Scholl, Bad Vilbel (DE)

(73) Assignee: Chemetall GmbH, Frankfurt am Main (DE)

( * ) Notice: Subject to any disclaimer, the term of this patent is extended or adjusted under 35 U.S.C. 154(b) by 607 days.

(21) Appl. No.: 10/469,471

(22) PCT Filed: Mar. 5, 2002

(86) PCT No.: PCT/EP02/02391

§ 371 (c)(1),
(2), (4) Date: Oct. 9, 2003

(87) PCT Pub. No.: WO02/071528

PCT Pub. Date: Sep. 12, 2002

(65) Prior Publication Data

US 2004/0076887 A1    Apr. 22, 2004

(30) Foreign Application Priority Data

Mar. 8, 2001 (DE) .............................. 101 11 410

(51) Int. Cl.
*H01M 6/16* (2006.01)
(52) U.S. Cl. .................. 429/332; 429/333; 429/330; 429/334; 429/335; 429/307; 429/331; 252/62.2

(58) Field of Classification Search ................ 429/332, 429/333, 330, 334, 335, 307, 331; 252/62.2
See application file for complete search history.

(56) References Cited

U.S. PATENT DOCUMENTS

| 6,506,516 B1 * | 1/2003 | Wietelmann et al. ....... 429/188 |
| 6,787,267 B2 * | 9/2004 | Tsujioka et al. ........... 252/62.2 |
| 2004/0034253 A1 * | 2/2004 | Angell et al. ............... 429/303 |

FOREIGN PATENT DOCUMENTS

| EP | 0 922 049 A | 6/1999 |
| EP | 1 052 714 A | 11/2000 |
| JP | 07 153486 A | 6/1995 |
| WO | WO-00 00495 A | 1/2000 |

OTHER PUBLICATIONS

Libob And its derivatives Weakly . . . Solutions, Xu, et al., Electrochemical and Solid-State Letters, Jan. 1, 2001.

* cited by examiner

*Primary Examiner*—Laura Weiner
(74) *Attorney, Agent, or Firm*—Fulbright & Jaworski L.L.P.

(57) ABSTRACT

Electrolytes containing lithium-bis(oxalato)borate, a cyclic carbonate, one or more compounds selected from acrylic carbonates, aliphatic esters, alicyclic ethers and aliphatic, difunctional ethers, one or more compounds selected from lactones, dinitriles, compounds that contain at least one carboxylic acid ester group and an ether group, compounds that contain at least one carbonic acid group and an ether group, compounds that contain at least one nitrile group and an ether group, trialkyl phosphoric acid esters and trialkyl boric acids.

5 Claims, 2 Drawing Sheets

Figure 1:
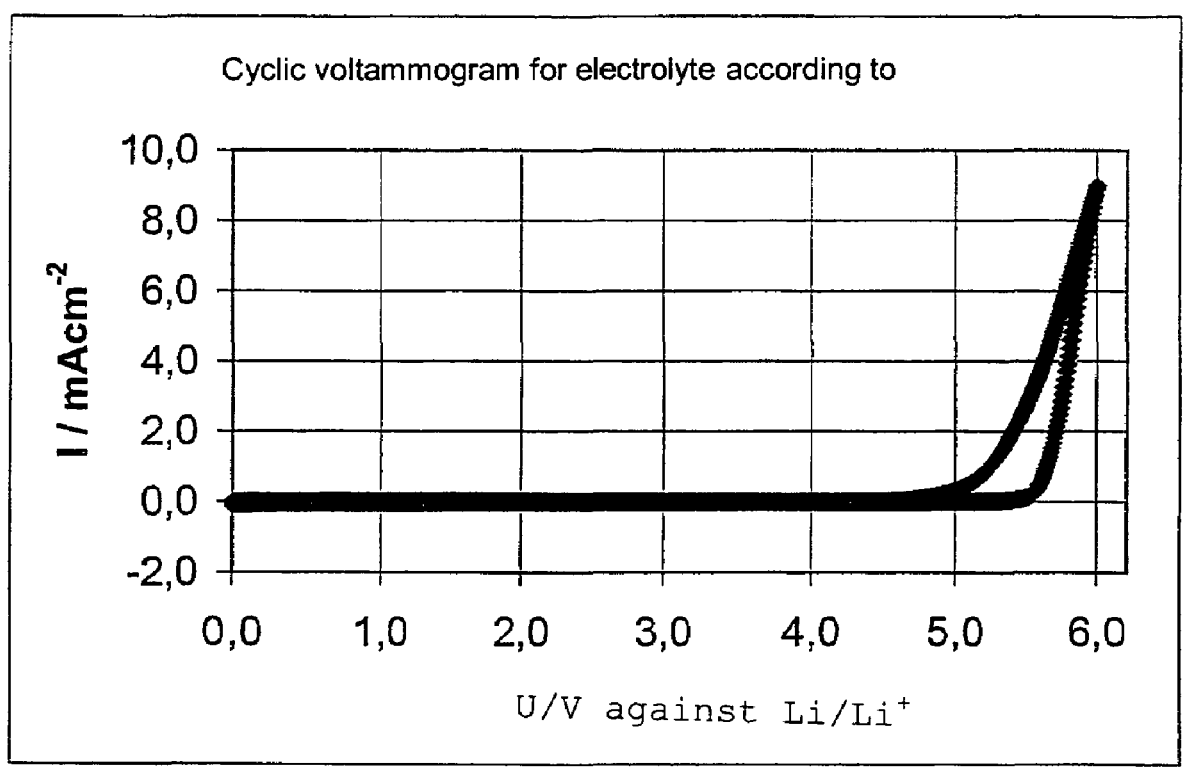

Electrochemical suitability of electrolyte 4 for use in lithium ion batteries

ELECTROLYTES FOR LITHIUM ION BATTERIES

The invention concerns electrolytes for lithium ion batteries.

In many commercial lithium ion batteries lithium hexafluorophosphate is used as the supporting electrolyte. This salt has all necessary properties for use in such batteries, it is characterised in particular by good solubility in aprotic solvents, combined with a comparatively high ionic conductivity of its solutions. When used as the sole supporting electrolyte, however, lithium hexafluorophosphate also has serious disadvantages, in particular the poor thermal stability and the marked tendency to hydrolyse in the presence of traces of water, which involves the formation of hydrofluoric acid, HF, and phosphorus oxytrifluoride, $POF_3$.

Intensive efforts are therefore being made to develop supporting electrolytes that avoid the cited disadvantages of lithium hexafluorophosphate. DE 19633027 A, EP 0698301 B1, EP 0907217 A2 and DE 19829030 C1 describe the use of lithium salts in lithium ion batteries. In these lithium salts the anions are chelatoborates with the general formula $BL_2$, wherein L is a bidentate ligand which is bonded to the boron atom via two oxygen atoms.

Whilst the lithium salts described in DE 19633027 A having the general formula

$$Li[B(OR^1)_2(OR^2)_2] \qquad (1)$$

are only suitable as supporting electrolytes for use in lithium ion batteries if the organic radicals $R^1$ and $R^2$ that are used are partially fluorinated or perfluorinated, DE 19829030 C1 discloses a supporting electrolyte, namely lithium bis(oxalato)borate, which displays an outstanding electrochemical stability. The inherent advantage of this salt is that it can be produced and used without the use of halogens and halogenated compounds, in particular fluorine and compounds thereof.

A disadvantage of the use of lithium bis(oxalato)borate and other lithium chelatoborates, however, is that their solutions in binary solvent blends often display lower ionic conductivities than comparable solutions of other supporting electrolytes, in particular lithium hexafluorophosphate. For example, a 0.6 molar solution of lithium bis(oxalato)borate in ethylene carbonate/dimethyl carbonate (EC/DMC) 1:1 has a conductivity of 7 mS/cm, whereas a 1.0 molar solution of $LiPF_6$ in the same solvent has a conductivity of 11 mS/cm. In addition, the concentration of lithium bis(oxalato)borate in binary solvent blends based on organic carbonates is limited. Often a concentration of at most only 0.7 to 0.8 mol/l lithium bis(oxalato)borate can be achieved in these solvent blends.

The electrolyte used must also guarantee that the battery will function in as broad as possible a temperature range, particularly at extremely low temperatures. However, the solution of lithium bis(oxalato)borate in EC/DMC that has already been described solidifies below temperatures of just −15° C. and then displays conductivities of around 10 to 100 µS/cm, which are insufficient to operate a battery at conventional current densities. This represents a further serious disadvantage of solutions of lithium bis(oxalato)borate (or other supporting electrolytes) in binary solvent blends based on organic carbonates.

EP 0980108 A1 describes quaternary mixtures of ethylene carbonate, dimethyl carbonate, diethyl carbonate and ethyl methyl carbonate, a process for their production, and the use of such mixtures for the production of electrolytes based on $LiAsF_6$ with improved temperature properties. If a similar quaternary mixture is used to produce an electrolyte using lithium bis(oxalato)borate as the supporting electrolyte, the conductivity at low temperatures (−20° C.) improves, but the conductivity at room temperature falls to 5.5 mS/cm.

It is also known that solutions of lithium bis(oxalato)borate in mixtures of propylene carbonate and 1,2-dimethoxyethane (1:1) achieve conductivities of up to 14 mS/cm (DE 19829030 C1). Such formulations are typically designed for use in primary lithium batteries. More recent works report that high proportions of 1,2-dimethoxyethane are not suitable for use in secondary lithium ion batteries, however (Katsuya Hayashi et al., Key Engineering Materials Vols. 181–182 (2000), pp. 143–146). 1,2-dimethoxyethane can be used in an EC/DME solvent blend up to a proportion of <20 vol. %, however, without any disadvantageous effects.

The ionic conductivity of the electrolyte has a direct effect on the energy density and power density of a galvanic cell filled with such electrolytes. In particular, the amount of charge that can be drawn under elevated current loading falls as a result of too low a conductivity of an electrolyte. One way of lessening the disadvantage of electrolytes produced on the basis of lithium bis(oxalato)borate in terms of its high-current loading capability is to use larger electrode surfaces in the corresponding batteries in order in this way to be able to draw the desired amounts of charge at lower current densities. The disadvantages of such a solution would then be the excessively large volume and excessively large mass of such a battery, this set against the background also that the batteries are to be used e.g. in portable devices with low overall weights. The high-current loading capability of a battery is also affected by the concentration of the supporting electrolyte, since this has an influence on the conductivity of the electrolyte. In addition, the constant availability of an adequate concentration of lithium ions at the interfaces between the electrolyte and electrodes must be ensured.

The object of the present invention is to overcome the disadvantages of the prior art and in particular to produce electrolytes for use in electrochemical storage systems, e.g. lithium ion batteries, which display a good and stable conductivity both at room temperature and at low temperatures.

The object is achieved by electrolytes displaying the following constituents:
lithium bis(oxalato)borate,
a cyclic carbonate in a quantity of 10 to 35 wt. %, preferably 10 to 30 wt. %,
one or more compounds in a quantity of 35 to 55 wt. %, selected from acyclic carbonates, aliphatic esters, alicyclic ethers and aliphatic difunctional ethers,
one or more compounds in a quantity of 5 to 40 wt. %, preferably 10 to 40 wt. %, selected from lactones (preferably γ-lactones), dinitriles, compounds containing at least one carboxylic acid ester group and an ether group, compounds containing at least one carbonic acid ester group and an ether group, compounds containing at least one nitrile group and an ether group, trialkyl phosphoric acid esters and trialkyl boric acid esters.

It was found that in electrolytes with this combination of features lithium bis(oxalato)borate displays a satisfactory to very good solubility, the solubility is virtually independent of the temperature and ionic conductivities of >9 mS/cm at room temperature and >2.5 mS/cm at −25° C. are achieved.

In addition to lithium bis(oxalato)borate, the electrolyte can also contain one or more other lithium salts or alkali metal or ammonium salts, the molar ratio of lithium bis (oxalato)borate to the other salts being 99:1 to 80:20. The concentration of lithium bis(oxalato)borate or of the mixture of lithium bis(oxalato)borate and one or more of the cited salts is preferably 0.2 mol to 2 mol/kg electrolyte, which depending on the salts that may be added corresponds to a proportion of preferably 4 to 35 wt. % in the final electrolyte. Other lithium salts can be: $LiBF_4$, $LiPF_6$, $LiAsF_6$, $LiClO_4$, LiF, LiCl, LiBr, LiI, $LiCF_3SO_3$, $LiN(CF_3SO_2)_2$, $LiN(C_2F_5SO_2)_2$, $LiC(CF_3)SO_2)_3$, and other alkali metal salts or ammonium salts from the class of chelatoborates having the general formula (1), wherein the lithium cation can be replaced by another alkali metal cation or an ammonium ion.

Ethylene carbonate (EC), propylene carbonate (PC), butylene carbonate (BC), vinylene carbonate (VC) or a mixture of these carbonates can be used as the cyclic carbonate.

One constituent of the electrolyte consists of one or more compounds selected from acyclic carbonates, aliphatic esters, alicyclic ethers and aliphatic difunctional ethers.

Acyclic carbonates can have the general formula $R_1O(CO)OR_2$, where $R_1$, $R_2=C_nH_{2n+1}$ and n=1 to 4, and wherein $R_1$ and $R_2$ can be identical. Examples of such acyclic carbonates are dimethyl carbonate (DMC), diethyl carbonate (DEC), dipropyl carbonate (DPC), ethyl methyl carbonate (EMC), methyl propyl carbonate (MPC), butyl methyl carbonate (BMC), ethyl propyl carbonate (EPC) and butyl ethyl carbonate (BEC). The use of DMC, DEC, EMC or a mixture of these compounds is preferred. The use of EMC is particularly preferred.

Aliphatic esters can have the general formula $R_1(CO)OR_2$, where $R_1$=H or $C_nH_{2n+1}$, and n=1 to 4, and $R_2=C_nH_{2n+1}$ and n=1 to 4. Examples of such aliphatic esters are methyl formate, ethyl formate, propyl formate, methyl acetate, ethyl acetate (EA) and butyl acetate. The use of propyl formate, ethyl acetate or a mixture of these compounds is preferred.

Alicyclic ethers can be tetrahydrofuran (THF), or 2-methyl tetrahydrofuran or tetrahydropyran (THP).

Aliphatic, difunctional ethers can have the general formula $R_1OR_2OR_3$, where $R_1$ and $R_3$=aliphatic radicals having the formula $—C_nH_{2n+1}$ and n=1 to 4, and where $R_2=—(CH_2)_m—$ and m=1 to 4, and wherein $R_1$ and $R_3$ can be identical. Examples of such aliphatic, difunctional ethers are dimethoxyethane (DME) and diethoxyethane (DEE).

One constituent of the electrolyte consists of one or more compounds selected from lactones, dinitriles, compounds containing at least one carboxylic acid ester group and an ether group, compounds containing at least one carbonic acid ester group and an ether group, compounds containing at least one nitrile group and an ether group, trialkyl phosphoric acid esters and trialkyl boric acid esters.

Lactones can preferably be γ-lactones, such as γ-butyrolactone (GBL) or γ-valerolactone (GVL).

Dinitriles can have the general formula $CNR_1CN$, where $R_1=—(CH_2)_n—$ and n=2 to 8. Examples are glutaronitrile (GTN) or adiponitrile (ADN).

Compounds containing at least one carboxylic acid ester group and an ether group can have the general formula $R_1(CO)OR_2OR_3$, where $R_1=—C_nH_{2n+1}$ and n=1 to 4, $R_2=—(CH_2)_n—$ n=2 to 5, or $R_2=—(CH_2CH_2O)_m—$ where m=2 to 4, and $R_3=—C_nH_{2n+1}$ and n=1 to 4. Examples of such compounds are methoxyethyl acetate, ethoxyethyl acetate and 2-(2-ethoxyethoxy)ethyl acetate.

Compounds containing at least one carbonic acid ester group and an ether group can have the general formula $R_1OR_2O(CO)OR_3$, where $R_1$, $R_3=—C_nH_{2n+1}$ and n=1 to 4 and $R_2=—(CH_2)_n—$ and n=2 to 5. One example of such compounds is (2-methoxyethyl)methyl carbonate (MOEMC).

Compounds containing at least one nitrile group and an ether group can have the general formula $R_1OR_2(CN)$, where $R_1=—C_nH_{2n+1}$ where n=1 to 4, and $R_2=—(CH_2)_m—$ where m=1 to 6. One example of such compounds is methoxypropionic acid nitrile.

Trialkyl phosphoric acid esters have the general formula $(R_1O)(R_2O)(R_3O)(PO)$, wherein $R_1$, $R_2$ and $R_3$ represent aliphatic radicals of the type $—C_nH_{2n+1}$ where n=1 to 6, or wherein $R_1$, $R_2$, $R_3$ represent aliphatic radicals of the type $—((CH_2)_k—X—)_l—C_mH_{2m+1}$ where k=1 to 4, l=1 to 4, m=1 to 4 and X=O, S, or $N(R_4)$ where $R_4=C_nH_{2n+1}$ where n=1 to 4, and wherein each of the radicals $R_1$, $R_2$ and $R_3$ can be identical. Compounds of this type can be used alone or in mixtures. One example of such compounds is trimethyl phosphate.

Trialkyl boric acid esters have the general formula $(R_1O)(R_2O)(R_3O)B$, wherein $R_1$, $R_2$, $R_3$ represent aliphatic radicals having the formula $—C_nH_{2n+1}$, where n=1 to 6, or wherein $R_1$, $R_2$, $R_3$ represent aliphatic radicals of the type $—((CH_2)_k—X—)_l—C_mH_{2m+1}$ where k=1 to 4, l=1 to 4, m=1 to 4 and X=O, S, or $N(R_4)$ where $R_4=C_nH_{2n+1}$ where n=1 to 4, and wherein each of the radicals $R_1$, $R_2$ and $R_3$ can be identical. Compounds of this type can be used alone or in mixtures. One example of such compounds is tributyl borate.

The electrolyte can additionally contain additives, such as pyrocarbonic acid esters (e.g. pyrocarbonic acid dimethyl ester, pyrocarbonic acid di-tert-butyl ester (=di-tert-butyl dicarbonate)), halogenated organic carbonates (e.g. chloroethylene carbonate, 1-choroethyl ethylene carbonate), polyethylene glycol ether or N-methyl oxazolidone, the total content of additives preferably being 0 to 10 wt. % relative to the final electrolyte.

The electrolyte according to the invention most preferably contains the following constituents (figures in wt. %):

| | |
|---|---|
| lithium bis(oxalato)borate | 10 to 20 |
| ethylene carbonate | 15 to 35 |
| at least one of the substances dimethyl carbonate, diethyl carbonate, ethylene methylene carbonate or ethyl acetate | 35 to 55 |
| γ-butyrolactone | 15 to 35 |

A further particularly preferred variant of the electrolyte according to the invention contains the following constituents:

| | |
|---|---|
| lithium bis(oxalato)borate | 10 to 20 |
| ethylene carbonate | 15 to 25 |
| at least one of the substances dimethyl carbonate, diethyl carbonate or ethylene methylene carbonate | 30 to 50 |
| dimethoxyethane | 5 to 20 |
| γ-butyrolactone | 15 to 35 |

A process for the production of the electrolytes according to the invention can be described as follows:

An electrolyte solution is first produced by dissolving the supporting electrolyte in the solvent components. This is dried by the addition of suitable desiccants such as e.g. lithium hydride. The desiccant is then separated off from the dried electrolyte. Separation can take place by centrifuging or filtration. Filtration can be performed through a bed of particles, which can consist of oxides, ceramic materials or poorly soluble lithium salts. Examples of such oxides are magnesium oxide, calcium oxide, aluminium oxide, titanium dioxide and zirconium oxide. Examples of ceramic materials are silicon carbide and silicon nitride. Examples of poorly soluble lithium salts are lithium carbonate, lithium metaborate, lithium aluminate and lithium phosphate.

If ethylene carbonate is used as the cyclic carbonate, this can be used in solid or liquid form in a preferred temperature range from 15 to 45° C.

The ethylene carbonate dissolution process is associated with a positive enthalpy. The dissolution of lithium salts in organic solvents, on the other hand, is often associated with a negative enthalpy of solution. If a mixture of ethylene carbonate and lithium bis(oxalato)borate is dissolved in the other cited constituents, cooling of the solvent blend before introduction of the supporting electrolyte, which would otherwise be necessary, can advantageously be dispensed with (cf. DE 19827630 A1, where cooling to 10° C. is provided in examples 1 to 3).

The electrolytes according to the invention can be used in electrochemical storage systems or in electrochromic preparations (e.g. windows).

The invention is explained in more detail below by reference to examples:

COMPARATIVE EXAMPLE A

Production of an Electrolyte According to the Prior Art 86 g solid ethylene carbonate (EC) and 30 g lithium bis(oxalato)borate (LOB) were added to a mixture of 45 g dimethyl carbonate (DMC), 22 g diethyl carbonate (DEC) and 57 g ethyl methyl carbonate (EMC). After dissolution of the EC and the LOB, 2 g LiH were added. After stirring for 2 hours the LiH was removed by filtration through a bed consisting of 30 g aluminium oxide. The water content of the electrolyte obtained was determined by means of a coulometric Karl Fischer titration as <20 ppm. The conductivity of this electrolyte as a function of the temperature is shown in Table 2.

COMPARATIVE EXAMPLE B

Production of an Electrolyte According to the Prior Art 91.4 g solid EC and 30 g LOB were to a mixture of 91.4 g DEC and 27.2 g dimethoxyethane (DME). After dissolution of the EC and the LOB, 2 g LiH were added. After stirring for 2 hours the LiH was removed by filtration through a bed consisting of 30 g aluminium oxide. The water content of the electrolyte obtained was determined by means of a coulometric Karl Fischer titration as <20 ppm. The conductivity of this formulation as a function of the temperature is shown in Table 2.

EXAMPLE 1

Production of an Electrolyte from LOB, EC, DMC, DEC, EMC, DME and GBL 63 g solid EC and 30 g LOB were added to a mixture of 30.5 g DMC, 15.0 g DEC, 38.5 g EMC, 21 g DME, 63 g γ-butyrolactone (GBL). After dissolution of the EC and the LOB, 2 g LiH were added. After stirring for 2 hours the LiH was removed by filtration through a bed consisting of 30 g aluminium oxide. The water content of the electrolyte obtained was determined by means of a coulometric Karl Fischer titration as <20 ppm. The conductivity of this formulation as a function of the temperature is shown in Table 2.

EXAMPLE 2

Production of an Electrolyte from LOB, EC, DMC, DEC, EMC, DME and GBL 192 g solid EC and 180 g LOB were added to a mixture of 127 g DMC, 62 g DEC, 161 g EMC, 140 g DME and 192 g GBL. After dissolution of the EC and the LOB, 4 g LiH were added. After stirring for 4 hours the LiH was removed by filtration through a bed consisting of 75 g aluminium oxide. The water content of the electrolyte obtained was determined by means of a coulometric Karl Fischer titration as <20 ppm. The conductivity of this formulation as a function of the temperature is shown in Table 2.

EXAMPLE 3

Production of an Electrolyte from LOB, EC, EA and GBL 25 g solid EC and 17.8 g LOB were added to a mixture of 55 g EA (ethyl acetate) and 20 g GBL. The solvents had a water content of <20 ppm. The water content of the LOB was <100 ppm. After stirring for 30 minutes the solution was filtered through a PTFE membrane (d=450 nm). The conductivity of this formulation as a function of the temperature is shown in Table 2.

EXAMPLE 4

Production of an Electrolyte from LOB, EC, EA and GBL 35 g solid EC and 17.8 g LOB were added to a mixture of 45 g EA and 20 g GBL. The solvents had a water content of <20 ppm. The water content of the LOB was <100 ppm. After stirring for 30 minutes the solution was filtered through a PTFE membrane (d=450 nm). The conductivity of this formulation as a function of the temperature is shown in Table 2.

The compositions of the electrolytes described in the examples are summarised in Table 1.

TABLE 1

Composition of the electrolytes from comparative examples A and B and from examples 1 and 2 according to the invention

| Example | LOB mol/kg | LOB wt. % | EC wt. % | DMC wt. % | DEC wt. % | EMC wt. % | EA wt. % | DME wt. % | GBL wt. % |
|---|---|---|---|---|---|---|---|---|---|
| A | 0.65 | 12.5 | 35.7 | 18.7 | 9.4 | 23.7 | — | — | — |
| B | 0.65 | 12.5 | 38.1 | — | 38.1 | — | — | 11.3 | — |
| 1 | 0.65 | 12.5 | 17.6 | 12.6 | 6.3 | 16.1 | — | 8.7 | 26.2 |
| 2 | 0.88 | 17.0 | 18.2 | 12.1 | 5.9 | 15.3 | — | 13.2 | 18.3 |
| 3 | 0.77 | 15.0 | 21.2 | — | — | — | 46.7 | — | 17.0 |
| 4 | 0.77 | 15.0 | 29.7 | — | — | — | 38.0 | — | 17.0 |

EXAMPLE 5

Comparison of the Ionic Conductivities of the Electrolytes from the Comparative Examples and the Examples According to the Invention Electrolytes for lithium ion batteries should have adequate conductivities even at low temperatures. In order to be able to compare the electrolytes described above with one another, the conductivities of the electrolyte solutions were measured in a temperature-controllable cell, for which a 4-electrode measuring cell was used, and the procedure was conducted as follows:

The conductivity was first measured at +25° C. (T1). The sample was then cooled to −25°C. The conductivity was measured one hour after the start of cooling (T2) and two hours after the start of cooling (T3). It was then cooled further to −42° C., the conductivity measured (T4), the temperature held at −42 to −43° C. and the conductivity measured (T5). The sample was then heated to −25° C. again and the conductivity measured 30 minutes after the start of heating (T6). The sample was then heated to −5° C. (T7) and then to +55° C. (T8) before finally being brought back to the starting temperature of +25° C. (T9). The conductivities were measured at all temperatures.

During measurement of the conductivity of electrolyte A a white deposit appeared at −42° C. No such deposit was observed in any of the electrolytes from examples 1 to 4 according to the invention.

The measurement results are given in Table 2.

TABLE 2

| | Conductivity/[mS/cm] at temperatures T1 to T9 | | | | | | | | |
|---|---|---|---|---|---|---|---|---|---|
| Ex. | T1 25° C. | T2 −25° C. | T3 −25° C. | T4 −42° C. | T5 −42° C. | T6 −25° C. | T7 −5° C. | T8 55° C. | T9 25° C. |
| A | 5.42 | 0.82 | 0.77 | 0.16 | 0.10 | 0.26 | 1.09 | 5.04 | 3.41 |
| B | 7.29 | 1.52 | 1.23 | 0.09 | 0.06 | 0.27 | 0.88 | 10.74 | 6.90 |
| 1 | 9.02 | 2.34 | 2.32 | 0.89 | 0.88 | 2.27 | 5.54 | 13.94 | 8.98 |
| 2 | 7.48 | 1.48 | 1.48 | 0.45 | 0.44 | 1.48 | 3.57 | 12.09 | 7.44 |
| 3 | 8.6 | 2.52 | 2.40 | 1.12 | 1.08 | 2.40 | 4.75 | 12.78 | 8.6 |
| 4 | 9.21 | 2.24 | 2.15 | 0.82 | 0.82 | 2.25 | 5.01 | 15.19 | 9.37 |

It can be seen from Table 2 that electrolyte A corresponding to the prior art displayed the lowest conductivity at all temperatures. Although electrolyte B, which likewise corresponds to the test prior art, displayed a conductivity at the start of the test series at 25° C. in the same order of magnitude as electrolyte 2 according to the invention, at −42° C. in particular a clear drop in conductivity could be observed which continued still further when this temperature was held. Furthermore, at the end of the test series the initial conductivity at 25° C. was not regained.

By contrast, electrolytes 1 to 4 according to the invention displayed substantially higher conductivities than electrolytes A and B, particularly at low temperatures (−42° C.). The conductivities fell no further even when the temperature was held at −42° C. At the end of the test series the initial conductivities at 25° C. were also regained within the limits of measuring accuracy (+/−3%).

EXAMPLE 6

Electrochemical Stability Range of Electrolyte 1

The electrochemical stability range of electrolyte 1 can be seen in the cyclic voltammogram illustrated in FIG. 1 (nickel electrodes, lithium reference electrode, 1 mV/s potential feed). No significant current densities can be seen in the potential window between 2.5 and 4.8 V.

EXAMPLE 7

Suitability of Electrolyte 4 for Use in Lithium Ion Batteries

Figure 2:
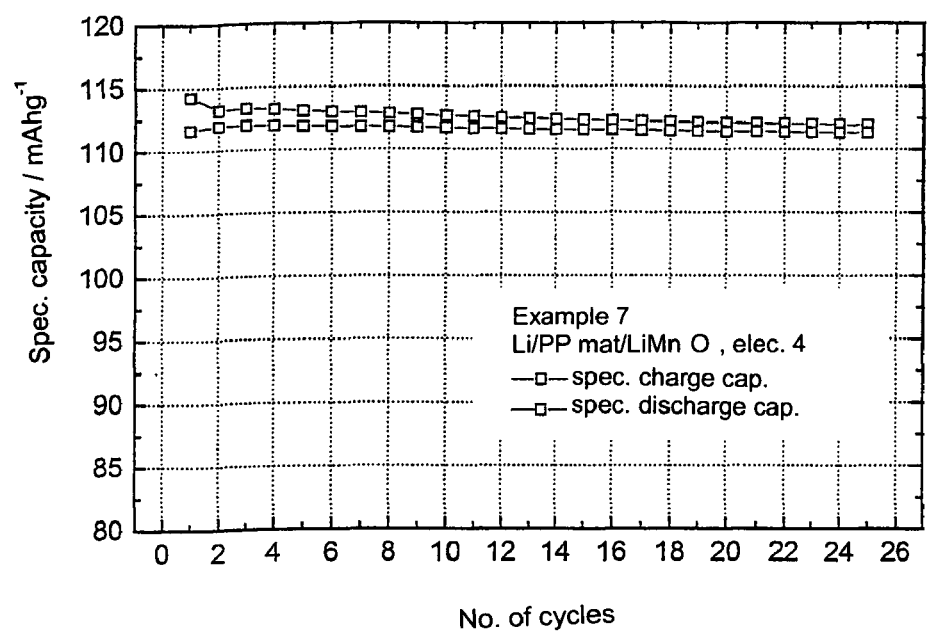

The suitability of electrolyte 4 for use in lithium ion batteries was analysed by means of charging/discharging experiments. A coating containing 87 wt. % lithium manganese spinel as active component, 5 wt. % carbon black and 5 wt. % of a fine-particle graphite to improve the electrical conductivity and 3 wt. % polyvinylidene fluoride as polymer binder and applied to an aluminium sheet (=current collector) was used as the cathode. The anode consisted of a sheet of lithium metal. A polypropylene mat was used as the separator. The galvanic cell obtained in this way was charged and discharged with a current density of 1.0 mA/cm$^2$. FIG. 2 shows the specific charge/discharge capacities obtained in this way for the first 25 cycles. The drop in specific discharge capacity measured over cycles 10 to 25 is 0.025 mAh/g per cycle. This stable progress of charge capacities as a function of the number of cycles indicates that the electrolyte is highly suitable for use in lithium ion batteries.

The invention claimed is:

1. An electrolyte comprising:
   lithium bis(oxalato)borate;
   10 to 35 35 wt. % of a cyclic carbonate;
   35 to 55 wt % of at least one compound selected from the group consisting of acyclic carbonates, aliphatic esters, alicyclic ethers and aliphatic, difunctional ethers,
   of 5 to 40 wt. % of a member selected from the group consisting of a lactone, a dinitrile, a compound having at least one carboxylic acid ester group and an ether group, a compound having at least one carbonic acid ester group and an ether group, a compound having at least one nitrile group and an ether group, a trialkyl phosphoric acid ester and a trialkyl boric acid ester.

2. The electrolyte according to claim 1, further comprising at least one additional salt selected from the group consisting of lithium salt, an alkali metal salt or an ammonium salt, the molar ratio of lithium bis(oxalato)borate to additional salt being 99:1 to 80:20; wherein the additional is not lithium bis(oxalato)borate.

3. The electrolyte according to claim 2, wherein the sum of the proportions of lithium bis(oxalato)borate and alkali metal or ammonium salts in the final electrolyte is 4 to 35 wt. %.

4. The electrolyte according to claim 1 wherein the electrolyte further comprises at least one additive selected from the group consisting of a pyrocarbonic acid, a halogenated organic carbonate, a polyethylene glycol ether and N-methyl oxazolidone.

5. The electrolyte according to claim 1 comprising
   10 to 20 wt. % lithium bis(oxalato)borate;
   15 to 35 wt. % ethylene carbonate;
   35 to 55 wt. % of at least one of the substances selected from the group consisting of dimethyl carbonate, diethyl carbonate, ethyl methyl carbonate ethyl acetate;
   and 20 to 35 wt % γ-butyrolactone.

* * * * *